United States Patent [19]

Battey et al.

[11] Patent Number: 4,855,346
[45] Date of Patent: Aug. 8, 1989

[54] RUBBER STABILIZERS DERIVED FROM N-PHENYL-P-PHENYLENEDIAMINE

[75] Inventors: Paul K. Battey, Harrogate; Peter Hope, Littleborough; Ashutosh H. Sharma, Norden, all of Great Britain

[73] Assignee: Akzona Incorporated, Asheville, N.C.

[21] Appl. No.: 647,258

[22] Filed: Sep. 4, 1984

Related U.S. Application Data

[63] Continuation of Ser. No. 560,763, Dec. 12, 1983, abandoned, which is a continuation of Ser. No. 399,581, Jul. 19, 1982, abandoned.

[30] Foreign Application Priority Data

Jul. 21, 1981 [NL] Netherlands ............... 8103441

[51] Int. Cl.$^4$ ............................... C08K 5/18
[52] U.S. Cl. ................... 524/217; 524/240; 524/925
[58] Field of Search ............ 524/217, 240, 925; 564/163, 164, 168; 560/43; 252/51.5 A; 546/225, 226, 315, 328; 548/540

[56] References Cited

U.S. PATENT DOCUMENTS 2,266,602 12/1941 Howland .................. 260/925
2,266,603 12/1941 Howland .................. 260/925
4,009,198 2/1977 Pawtak et al. ............ 524/240

OTHER PUBLICATIONS

CA 76, 13963K, (1972).

Primary Examiner—Veronica P. Hoke
Attorney, Agent, or Firm—Oliff & Berridge

[57] ABSTRACT

There are disclosed novel compounds of the formula:

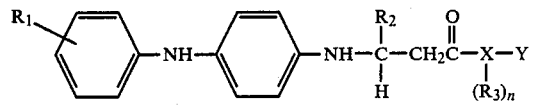

wherein $n=0$ or 1, $R_1$ is selected from the group consisting of a hydrogen atom, straight chain and branched chain alkyl groups and alkoxy groups, and cycloalkyl groups and cycloalkoxy groups having 5 to 8 carbon atoms, $R_2$ is selected from the group consisting of lower alkyl groups having 1 to 5 carbon atoms, X is an oxygen atom if $n=0$ or a nitrogen atom if $n=1$, Y is selected from the group consisting of a hydrogen atom, straight chain and branched chain alkyl groups having 1 to 18 carbon atoms, cycloalkyl groups having 5 to 8 carbon atoms, alkenyl groups having 3 to 18 carbon atoms, phenyl groups, alkylphenyl groups having 7 to 14 carbon atoms and aralkyl groups having 7 to 15 carbon atoms, and $R_3$ is selected from the same group as Y, or together with X and Y forms part of a heterocycle ring composed of 5 or 6 atoms in which X is the hetero-nitrogen atom. Also disclosed is the use of the foregoing compounds as stabilizers in rubber or rubber latex.

5 Claims, No Drawings

RUBBER STABILIZERS DERIVED FROM N-PHENYL-P-PHENYLENEDIAMINE

This is a continuation of application Ser. No. 560,763 filed Dec. 12, 1983, now abandoned, which in turn is a continuation of Ser. No. 399,581, filed July 19, 1982, now abandoned.

BACKGROUND OF THE INVENTION

This invention relates to certain novel N-phenyl p-phenylene diamino derivatives and their use as stabilizers in rubber or rubber latex. Compounds of the general formula:

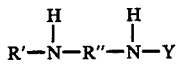

wherein R' represents an aryl group, R" an arylene group and Y a carboxy substituted alkyl group have already been described in U.S. Pat. No. 2,266,602. The compounds mentioned therein can all be characterized by the following, more specific formula:

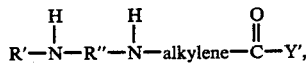

wherein Y' has the meaning of, for instance, a hydroxyl group, an —O—metal group, an —O—ammonium group, an alkoxy group, an —NH$_2$ group or an aryloxy group. Such compounds are recommended for use as antioxidants, for instance, in rubber. It has been found that although the compounds described in said patent constitute particularly valuable stabilizers in rubber or rubber latex, they exhibit the tendency to migrate from rubber vulcanizates and to cause discoloration of light colored rubbers, and enamelled or plastic objects upon contact with the vulcanizates. Moreover, such compounds are found to offer relatively little protection from ozone attack.

SUMMARY OF THE INVENTION

The present invention provides novel compounds which surprisingly lend far better resistance to ozonolysis than the structurally related compounds described in U.S. Pat. No. 2,266,602.

The invention provides novel compounds of the formula:

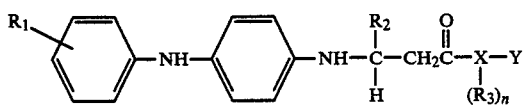

wherein n=0 or 1, $R_1$ is selected from the group consisting of a hydrogen atom, straight chain and branched chain alkyl groups and alkoxy groups, and cycloalkyl groups and cycloalkoxy groups having 5 to 8 carbon atoms, $R_2$ is selected from the group consisting of lower alkyl groups having 1 to 5 carbon atoms, X is an oxygen atom if n=0 or a nitrogen atom if n=1, Y is selected from the group consisting of a hydrogen atom, straight chain and branched chain alkyl groups having 1 to 18 carbon atoms, cycloalkyl groups having 5 to 8 carbon atoms, alkenyl groups having 3 to 18 carbon atoms, phenyl groups, alkylphenyl groups having 7 to 14 carbon atoms and aralkyl groups having 7 to 15 carbon atoms, and $R_3$ is selected from the same group as Y, or together with X and Y forms part of a heterocyclic ring composed of 5 or 6 atoms in which X is the hetero-nitrogen atom. Of course the straight chain and branched chain alkyl groups, the cycloalkyl groups, and the phenyl groups from which Y and $R_3$ may be selected include such groups which have been substituted. Suitable substituents include alkoxy, acyl and chlorine.

The present invention also relates to the use of the foregoing compounds as stabilizers in rubber or rubber latex.

Examples of alkyl groups which may be represented by $R_1$ include methyl, ethyl and isopropyl. Examples of cycloalkyl groups include cyclohexyl and α-methylcyclohexyl. The group represented by $R_1$ may be located at any free position in the benzene ring, but is preferably in the para position.

Examples of lower alkyl groups represented by $R_2$ include methyl, ethyl, propyl, isopropyl or pentyl.

Examples of suitable alkyl groups or alkenyl groups represented by the group Y include propyl, butyl, hexyl, palmityl, oleoyl, myristyl and stearyl. An example of a suitable alkylphenyl group is the benzyl group.

Favorable results have been obtained with compounds of the present invention wherein $R_1$ represents a hydrogen atom, $R_2$ represents a methyl group and Y is selected from methyl, ethyl, isopropyl, 2-ethylhexyl, cyclohexyl, 2-chloroethyl, t-butyl and n-octyl. Preference is given then to the use of compounds for which n=0, X is an oxygen atom and Y a sec. butyl or acetoxyethyl group. The same applies to compounds of the present invention in which n=1, X is a nitrogen atom, $R_3$ is a hydrogen atom and Y is also a hydrogen atom or a lower alkyl group or phenyl or substituted phenyl group.

Extremely high antioxidant activity under static ozone conditions is shown by compounds of the present invention wherein n=0, X is an oxygen atom and Y an alkoxyalkyl group. Examples of alkoxyalkyl groups include 2-methoxyethyl and 2-ethoxyethyl.

The novel N-phenyl-p-phenylene diamino derivatives can be prepared in a manner usually employed for the synthesis of analogous compounds. For instance, the novel compounds may be prepared by reductive amination of a corresponding p-aminodiphenylamine. In the case where $R_2$ and Y both represent a methyl group and X represents an oxygen atom one may use the acetoacetic methyl ester. In the case where Y and $R_3$ represent hydrogen and X is a nitrogen atom, the precursor may be the amide of acetoacetic acid. Amination may be carried out in the presence of a noble metal, preferably platinum, as catalyst. Further, it is preferred that an acid should be present as a catalyst. Advantageous use may be made of acetic acid.

Under some circumstances it may be advantageous first of all to effect condensation of the N-phenyl-p-phenylene diamine and subsequently to reduce the product.

Alternatively, instead of the N-phenyl-p-phenylene diamine the precursors may be the corresponding 4-nitro- and 4-nitrosodiphenylamines and 4-nitro- and 4-nitrosodiphenylhydroxylamines. In such instances preference is given to the use of a mixed platinum/palladium catalyst.

The invention further envisages providing natural and synthetic rubbers, rubber objects, and rubber latices in which a stabilizing amount of an N-phenyl-p-phenylenediamino derivative of the invention is incorporated. Examples of suitable synthetic rubbers include the following: polymers, including cis-polymers of 1,3-butadiene, isobutene, 2-methyl-1,3-butadiene and 2-chloro-1,3-butadiene and copolymers of such compounds together or with acrylonitrile, styrene, methylmethacrylate or other well known polymerizable compounds that are used in the preparation of synthetic rubbers.

The N-phenyl-p-phenylene diamino derivatives may be used for the preservation by usual methods of rubber, rubber objects, latices of natural rubber or synthetic rubbers, including cis-polybutadiene and cis-polyisoprene.

When the novel compounds are employed for instance for the preservation of rubber, they may be mixed with the rubber or rubber latex alone or along with vulcanizing agents and other constituents, including amorphous, macrocrystalline and microcrystalline waxes and the resulting mixtures may subsequently be cured by heating, or the compounds may be mixed with rubber, together with other constituents, after which the mixture may be vulcanized by subjecting it to a treatment with sulphurmonochloride in the cold.

The N-phenyl-p-phenylenediamino derivatives of the present invention are preferably added in an amount of 0.1 to 5% by weight, calculated on the weight of the rubber. Optionally, however, smaller or larger amounts may be employed. The rubber mixtures may contain the rubber in any desired form, for instance in a solid, a dispersed or some processed form, and may be vulcanized or not. Moreover, they may contain the known additives that are employed for use in rubber mixtures, for instance: pigments, fillers, plasticizers, expanding agents, antioxidants, vulcanizers, accelerators, retarding agents and waxes.

The novel N-phenyl-p-phenylene diamine derivatives of the present invention are particularly advantageous for use both in natural and synthetic rubbers. They may be used alone or in combination with other antiozonants. As previously stated, the known stabilizers based on N-phenyl-p-phenylene diamine display the tendency to migrate out of the rubber vulcanizates and cause discoloration of light colored rubbers and enamelled or plastic objects upon contact thereof with the vulcanizates. Further, the stabilizers of the present invention are particularly effective ozone inhibitors.

The invention will be illustrated in the following nonlimiting examples.

EXAMPLE I 4-aminodiphenylamine (36.8 g.), methylacetoacetate (24.4 g.), acetic acid (1 g.), methanol (250 ml.) and 5% platinum on carbon catalyst (1 g.) were stirred in a stainless steel autoclave and hydrogenated at 5 atmospheres pressure for 18 hours at ambient temperature. Upon completion of the reaction the pressure was released. The catalyst was recovered by filtration and the solvent removed from the filtrate to afford a maroon colored residual oil. This oil was dissolved in diethyl ether (150 ml.) and washed with a 10% sodium bicarbonate solution (3×30 ml.) in water and water (2×30 ml.). After drying the solution over anhydrous magnesium sulphate, the ether was removed to leave maroon oil (51 g.). Upon analysis this substance was found to consist of the methyl ester of N-(p-phenylamino)-phenyl-3-aminobutyric acid.

EXAMPLE II 4-aminodiphenylamine (36.8 g.), acetoacetanilide (35.4 g.), methanol (250 ml.), acetic acid (1 g.) and 5% platinum on carbon catalyst (1 g.) were stirred in a glass reaction vessel and hydrogenated at atmospheric pressure and ambient temperature. The hydrogen uptake was measured by means of a manometer and the reaction was terminated when 5% greater than theory had been consumed. The catalyst was recovered by filtration and the solvent removed from the filtrate to afford a green colored oil. This oil was dissolved in diethyl ether (350 ml.) and washed with 10% sodium carbonate solution (4×25 ml.) in water and water (2×25 ml.). After drying the solution over anhydrous magnesium sulphate, the ether was removed, leaving an orange-brown solid matter, which was ground to a powder. Upon analysis it was found that 56.2 g. of the anilide of N-(phenylamino)-phenyl-3-amino-butyric acid were obtained.

EXAMPLE III 4-aminodiphenylamine (55.2 g.), ethylacetoacetate (32 g.), acetic acid (3 g.) and benzene (150 ml.) were refluxed with stirring under a nitrogen atmosphere to form an azeotrope with water, of which 5.4 ml were removed over a period of 4–5 hours. The solvent was removed under vacuum to afford a brown oil which solidified on cooling. Extraction with refluxing 80°–100° C. petroleum ether gave a light colored solid (75 g.) melting point 70° C. Of the resulting ethyl ester of N-(p-phenylamino)-phenyl-3-amino crotonic acid 25 g were dissolved in 500 ml. methanol, after which the entire solution thus obtained was transferred to a stainless steel autoclave together with 1.25 g. of a 5% platinum on carbon catalyst. The reaction mixture was stirred and hydrogenated at a pressure of 5 atmospheres for 18 hours at ambient temperature. The catalyst was recovered by filtration and the solvent removed from the filtrate leaving a red colored oil. Upon analysis this oil was found to consist of 24.8 g. of the ethyl ester of N-(p-phenylamino)-phenyl-3-aminobutyric acid.

EXAMPLE IV

N-phenyl-(4-nitrosophenyl)hydroxylamine (19.5 g.), ethylacetoacetate (13 g.), acetic acid (1 g.), methanol (200 ml.), 5% platinum on carbon catalyst (1 g.) and 5% palladium on carbon catalyst (1 g.) were stirred in a stainless steel autoclave and hydrogenated at 5 atmospheres pressure and ambient temperature for 18 hours. Upon completion of the reaction the pressure was released and the catalyst recovered by filtration. The solvent was removed from the filtrate to afford a red-brown oil. This oil was dissolved in diethyl ether (200 ml.) and the solution washed with a 10% aqueous solution of sodium bicarbonate (3×25 ml.) and water (2×25 ml.). After drying the solution over anhydrous magnesium sulphate, the ether was removed to give a red colored oil (24 g.) which was identical in all respects with the product obtained in the preceding examples.

EXAMPLES V

The product of Example I (Compound A) was evaluated as an antidegradant in comparison to N-1,3-dimethylbutyl-N'-phenyl-p-phenylenediamine (Compound B) in the following standard rubber formulations (Compound B is a widely used antidegradant by the rubber industry; a known disadvantage of this compound is that it gives rise to severe migration staining).

|  | weight parts |
|---|---|
| Natural rubber | 100 |
| HAF carbon black | 45 |
| Zinc Oxide | 5 |
| Stearic acid | 3 |
| N—cyclohexyl-2-benzothiazylsulphenamide | 0.5 |
| Sulphur | 2.5 |
| Stabilizer | 0.1 and 2% |

Vulcanization was carried out at 143° C. for 35 minutes.

(a) The following physical properties of test samples were measured in accordance with DIN 53504:

| tensile strength (T) | $N/cm^2$ |
|---|---|
| elongation at break (E) | % |
| modulus (M) | $N/cm^2$ |

After the samples had been subjected to hot air aging at 70° C. for 7 days and to oxygen aging by the method of Bierer and Davis (DIN 53508) for 2 days at 70° C. and a pressure of 21 atmospheres, the above properties were measured again. The effect on the physical properties of the test samples expressed as a percentage of the initial measured values is shown in Table I.

(b) The resistance imparted by the products of the invention to degradation of natural rubber of ozone static conditions was assessed by clamping test specimens in a frame in such a way that elongations of 10%, 30% and 60% were developed over their surfaces. The test specimens were then treated with a circulating stream of air containing 50 pphm of ozone at 40° C. Crack formation was then monitored at periodic intervals of time by counting the total number of cracks formed which were visible with the naked eye, and also measuring their average length. These assessments were coded as follows:

| Number of Cracks | Average Crack Length |
|---|---|
| No cracks = 0 | No cracks = 0 |
| 1–3 cracks = 1 | <1 mm = 1 |
| 4–9 cracks = 2 | 1–3 mm = 2 |
| 10–27 cracks = 3 | 3–8 mm = 3 |
| 28–81 cracks = 4 | >8 mm = 4 |
| 82–243 cracks = 5 | |
| >244 cracks = 6 | |

The coded results of this static ozone test are given in Table II.

In recording the results, the assessment codings are separated by an oblique stroke with the number of cracks being indicated before and the average crack length after each oblique stroke.

TABLE I

RETENTION OF PHYSICAL PROPERTIES AFTER AGING

| | | Measured values before aging | | | Measured values in % of values before aging | | | | | |
|---|---|---|---|---|---|---|---|---|---|---|
| | | Tensile strength in $N/cm^2$ × 10 | Elongation at break in % | Modulus in $N/cm^2$ × 10 | hot air aging | | | aging oxygen | | |
| Stabilizer | Concentration % | | | | Tensile strength | Elongation at break | Modulus | Tensile strength | Elongation at break | Modulus |
| A | 1 | 300 | 504 | 161 | 102 | 104 | 111 | 87 | 105 | 81 |
| | 2 | 301 | 523 | 155 | 94 | 96 | 100 | 83 | 93 | 98 |
| B | 1 | 299 | 521 | 150 | 101 | 101 | 113 | 91 | 99 | 101 |
| | 2 | 290 | 536 | 142 | 108 | 101 | 115 | 96 | 101 | 102 |
| Blank | — | 275 | 463 | 165 | 84 | 90 | 99 | 18 | 21 | 95 |

TABLE II

| Stabilizer | Concentration % | 4 hours | | | 8 hours | | | 24 hours | | | 48 hours | | | 72 hours | | |
|---|---|---|---|---|---|---|---|---|---|---|---|---|---|---|---|---|
| | | 10% | 30% | 60% | 10% | 30% | 60% | 10% | 30% | 60% | 10% | 30% | 60% | 10% | 30% | 60% |
| Blank | 0 | 5/1 | 0/0 | 0/0 | 5/1 | 6/1 | 6/1 | 5/1 | 6/1 | 6/1 | 5/2 | 5/2 | 5/2 | 5/2 | 5/2 | 5/2 |
| Compound A | 1 | 0/0 | 0/0 | 0/0 | 5/1 | 0/1 | 0/0 | 6/1 | 0/0 | 6/1 | 5/2 | 6/1 | 6/1 | 5/2 | 6/1 | 6/1 |
| | 2 | 0/0 | 0/0 | 0/0 | 5/1 | 0/0 | 0/0 | 5/1 | 0/0 | 6/1 | 5/2 | 6/1 | 6/1 | 5/2 | 6/1 | 6/1 |
| Compound B | 1 | 1/1 | 0/0 | 0/0 | 3/1 | 0/0 | 0/0 | 4/1 | 6/1 | 6/1 | 3/2 | 6/1 | 6/1 | 4/3 | 5/2 | 5/2 |
| | 2 | 3/1 | 0/0 | 0/0 | 4/1 | 0/0 | 0/0 | 5/1 | 6/1 | 6/1 | 5/2 | 6/1 | 6/1 | 5/2 | 6/1 | 5/2 |

(c) In order to measure the resistance imparted by the products of the invention to degradation of natural rubber by ozone under dynamic conditions—test specimens clamped in such a way that they were longitudinally extended by 20% and caused to further extend to 40% greater than original length. This cycle of deformation was repeated 30 times/minute while air containing 50 pphm of ozone at 40° C. was circulated around the samples. Assessment of crack formation with time was again carried out using the method described above and the results of this dynamic ozone test are summarized in Table III.

TABLE III

| Stabilizer | Concentration % | 4 hrs. | 8 hrs. | 24 hrs. | 48 hrs. | 72 hrs. |
|---|---|---|---|---|---|---|
| Blank | — | 0/0 | 6/1 | 6/1 | 5/2 | 5/2 |
| Compound A | 1 | 0/0 | 0/0 | 6/1 | 6/1 | 6/1 |
| | 2 | 0/0 | 0/0 | 5/1 | 6/1 | 6/1 |
| Compound B | 1 | 0/0 | 0/0 | 6/1 | 6/1 | 5/2 |
| | 2 | 0/0 | 0/0 | 6/1 | 6/1 | 6/1 |

(d) The fatigue life of protected and non-protected samples of natural rubber were measured using a Monsanto Fatigue to Failure test rig at a stress/strain ratio of 2.19. The results obtained for a rubber sample containing no antioxidant and for samples containing Compound A and Compound B are given in Table IV.

TABLE IV

| Stabilizer | Concentration % | Average of cycles to break × 1000 | Activity % relative to blank |
|---|---|---|---|
| Blank | — | 28.3 | 100 |
| Compound A | 1 | 87.7 | 460 |
|  | 2 | 85.7 | 450 |
| Compound B | 1 | 77.7 | 408 |
|  | 2 | 88.0 | 462 |

(e) The extent was measured to which the stabilizer according to the present invention tends to migrate from the rubber vulcanizate and causes discoloration upon its contact with light coloured objects. The rubber samples to be tested to that end contained no stabilizer, a Compound A and a Compound B, respectively.

The rubber samples were contacted with white rubber for 7 days. The degree of discoloration of the white rubber is given in the following Table V.

TABLE V

| Stabilizer | Concentration % | Discoloration relative to blank |
|---|---|---|
| Blank | — | 100 |
| Compound A | 1 | 82 |
|  | 2 | 82 |
| Compound B | 1 | 32 |
|  | 2 | 25 |

EXAMPLE VI

In this Example it is demonstrated that the compounds according to U.S. Pat. No. 2,266,602 lend rubber a far lower resistance to degradation by ozone and to bending than the compounds of the present invention. As a comparative compound from said U.S. Patent N-(p-phenylamino)-phenyl-3-aminopropionic acid was used (Compound C). As a compound of the present invention again the methyl ester of N-(p-phenylamino)-phenyl-3-aminobutyric acid was employed (Compound A). The results of the bending test are given in Table VI.

TABLE VI

| Stabilizer | Concentration % | % Activity relative to blank |
|---|---|---|
| Blank | — | 100 |
| Compound A | 1 | 460 |
|  | 2 | 450 |
| Compound C | 1 | 127 |
|  | 2 | 145 |

From the above table it is evident that the Compound A of the invention provides a far better resistance to cracking upon repeated bending than the known Compound C.

The results of the static ozone test upon elongation of the test specimens by 30% are given below in Table VII. The results are coded in the same way as in Example V(b).

TABLE VII

| Stabilizer | Concentration % | 4 hours | 8 hours | 24 hours |
|---|---|---|---|---|
| Blank | 0 | 0/0 | 6/1 | 6/1 |
| Compound A | 1 | 0/0 | 0/0 | 0/0 |
|  | 2 | 0/0 | 0/0 | 0/0 |
| Compound C | 1 | 0/0 | 0/0 | 6/1 |
|  | 2 | 0/0 | 0/0 | 6/1 |

EXAMPLE VII

The following esters of N-(p-phenylamino)-phenyl-3-aminobutyric acid according to the invention were prepared, use being made of the same procedure as described in Example I:

| Compound | ester group |
|---|---|
| O | 2-methoxyethyl |
| D | 2-ethoxyethyl |
| E | 2-acetoxyethyl |
| F | isopropyl |
| G | sec. butyl |
| H | 2-ethylhexyl |
| I | cyclohexyl |
| J | 2-chloroethyl |
| K | ethyl |
| L | methyl |
| M | t-butyl |
| N | n-octyl |

The structure of the above compounds was confirmed by NMR-analysis. The compounds M, G and I were tested for their tendency to cause discoloration upon their contact with light colored objects (staining), as indicated in Example Ve. The rubber samples to be tested to that end contained no stabilizer, a Compound M, a Compound G or a Compound I. The degree of discoloration of the white rubber is given in the following Table VIII.

TABLE VIII

| Stabilizer | Concentration % | Discoloration relative to blank |
|---|---|---|
| Blank | — | 100 |
| Compound M | 2 | 72 |
| Compound G | 2 | 81 |
| Compound I | 2 | 63 |

The compounds M, G, H, I, J, F, N and E are incorporated into natural rubber in a proportion of 3% by weight. The samples were then tested using a Monsanto Fatigue-to-Failure test rig as indicated in Example Vd. The results obtained for a rubber sample containing no antioxidant and for the samples containing a compound M, G, H, I, J, F, N or E are given in the following Table IX.

TABLE IX

| Stabilizer | Activity % relative to blank |
|---|---|
| Blank | 100 |
| Compound M | 426 |
| Compound G | 400 |
| Compound H | 425 |
| Compound I | 442 |
| Compound J | 390 |
| Compound F | 563 |
| Compound N | 440 |
| Compound E | 363 |

The compounds G, H, F, N, E and, for comparison, Compound B (Example V) were incorporated into natural rubber in an amount of 3% by weight. The samples were then tested for their resistance to degradation by ozone static conditions as indicated in Example Vb. Before the test was carried out, the samples were prepared for 1 month at room temperature.

The results of the static ozone test upon elongation of the test specimens by 30% and the times after which the first crack appeared are given below in Table X. The results are denoted in the same way as in Example V(b).

TABLE X

| Stabilizer | Time 1st crack (hr) | Crack rating after 24 hours |
|---|---|---|
| Blank | 0 | 6/1 |
| G | 72 | — |
| H | 4 | 3/1 |
| F | 8 | 2/1 |
| N | 4 | 5/1 |
| E | 48 | — |
| B | 0 | 4/2 |

The static ozone test was repeated with the 2-ethoxyethyl ester of N-(p-phenylamino)phenyl-3-aminobutyric acid (Compound P) and, for comparison, Compound B (Example V) at concentrations of 2 and 3% by weight. The elongation of the test specimens in all cases was 10%. The results are summarized in the following table:

TABLE XI

| Stabilizer | Concentration (phr) | Time 1st crack (hrs) |
|---|---|---|
| P | 2 | 72 |
| B | 2 | 24 |
| P | 3 | >72 |
| B | 3 | 48 |

What is claimed is:

1. A compound of the formula:

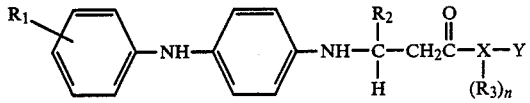

wherein n=0 or 1, $R_1$ is selected from the group consisting of a hydrogen atom, straight chain and branched chain alkyl groups and alkoxy groups, and cycloalkyl groups and cycloalkoxy groups having 5 to 8 carbon atoms, $R_2$ is selected from the group consisting of lower alkyl groups having 1 to 5 carbon atoms, X is an oxygen atom if n=0 or a nitrogen atom if n=1, Y is selected from the group consisting of straight chain and branched chain alkyl groups having 1 to 18 carbon atoms, cycloalkyl groups having 5 to 8 carbon atoms, alkenyl groups having 3 to 18 carbon atoms, phenyl groups, alkylphenyl groups having 7 to 14 carbon atoms and aralkyl groups having 7 to 15 carbon atoms, and $R_3$ is selected from a hydrogen atom and the same group as Y, or together with X and Y forms part of a heterocyclic ring composed of 5 to 6 atoms in which X is the hetero-nitrogen atom, wherein in each instance the straight chain and branched chain alkyl groups, the cycloalkyl groups and the aryl groups from which Y may be selected may be substituted with a substituent selected from the group consisting of acyl and chlorine, and wherein in each instance the straight chain and branched chain alkyl groups, the cycloalkyl groups and the aryl groups from which $R_3$ may be selected may be substituted with a substituent selected from the group consisting of alkoxy, acyl, and chlorine.

2. The compound of claim 1 wherein $R_1$ represents a hydrogen atom and $R_2$ represents a methyl group.

3. The compound of claim 1 wherein n=0, and X represents an oxygen atom and Y a lower alkyl group.

4. The compound of claim 1 or 2 wherein n=1, X represents a nitrogen atom, $R_3$ is a hydrogen atom, and Y represents a lower alkyl group or phenyl group.

5. A rubber or rubber latex containing a stabilizing amount of a compound according to claim 1.

* * * * *

UNITED STATES PATENT AND TRADEMARK OFFICE
CERTIFICATE OF CORRECTION

PATENT NO. : 4,855,346
DATED : August 8, 1989
INVENTOR(S) : Paul K. BATTEY et al It is certified that error appears in the above-identified patent and that said Letters Patent is hereby corrected as shown below:

On the title page:

IN THE ABSTRACT:

Line 19, change "heterocycle" to --heterocyclic--.

IN THE SPECIFICATION:

In Table I, column 6, under "Elongation at Break", change "105" to --106--.

Signed and Sealed this

Seventeenth Day of July, 1990

Attest:

HARRY F. MANBECK, JR.

Attesting Officer

Commissioner of Patents and Trademarks